United States Patent [19]

Muirhead et al.

[11] 3,970,125
[45] July 20, 1976

[54] TREE CUTTING APPARATUS

[75] Inventors: Aubrey S. Muirhead; John Martin; Patrick J. Martin; Ross H. Rigler, all of Prince George, Canada

[73] Assignee: Muirhead Machinery Ltd., Prince George, Canada

[22] Filed: July 2, 1973

[21] Appl. No.: 375,804

Related U.S. Application Data

[63] Continuation of Ser. No. 217,471, Jan. 13, 1972, abandoned.

[52] U.S. Cl. .................. 144/34 R; 144/309 AC; 144/3 D; 83/795; 83/928
[51] Int. Cl.² .................. A01G 23/08; B27B 5/10
[58] Field of Search .............. 144/34 R, 34 A, 34 E, 144/309 AC, 3 D; 83/928, 795

[56] References Cited
UNITED STATES PATENTS

| | | | |
|---|---|---|---|
| 2,583,945 | 1/1952 | Jacobs | 144/34 A |
| 3,059,677 | 10/1962 | Busch et al. | 144/309 AC |
| 3,457,977 | 7/1969 | Andersson et al. | 144/34 R |
| 3,672,412 | 6/1972 | Albright | 144/34 A |

Primary Examiner—Donald R. Schran
Attorney, Agent, or Firm—Fetherstonhaugh & Co.

[57] ABSTRACT

Apparatus for cutting through a standing tree near the base by advancing a power driven blade transversely through the tree trunk. The blade has a leading edge along which a motor driven cutting element is journalled and the element is a shaft provided with helical flutes and wood chipping edges. A tree tilting mechanism on the apparatus is operable to keep the kerf open behind the advancing element and to fall the severed tree to one side of the path of travel of the apparatus.

5 Claims, 6 Drawing Figures

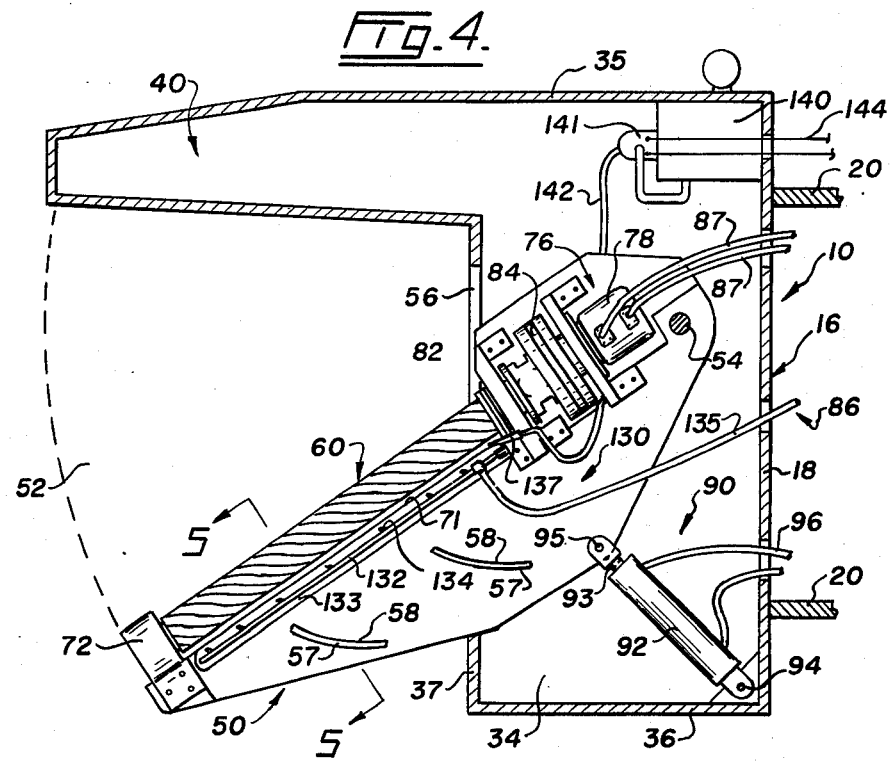
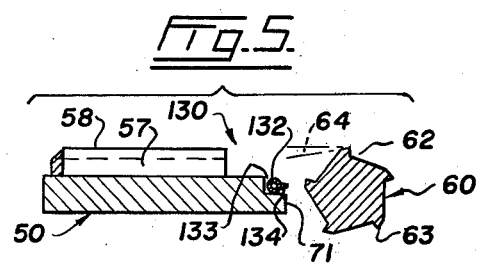
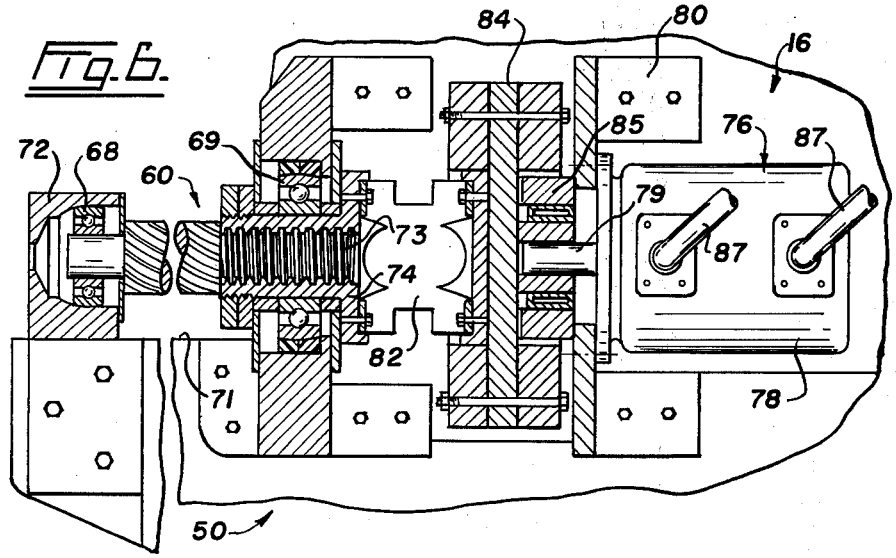

TREE CUTTING APPARATUS

This is a continuation of application Ser. No. 217,471, filed Jan. 13, 1972, now abandoned.

Our invention relates to apparatus for falling trees and more particularly to an attachment for a tractor or other vehicle and which is provided with a milling-type cutter.

There are a number of machines presently in use which are designed to cut trees by means of power driven shears. These scissor-like shears are forced through the wood and cause considerable damage to the wood fibers near the butt end of the tree. In some instances, a tree will be crushed or split up to 24 inches from the butt end and this wood must be trimmed away since some sawmills and veneer plants will not accept the damaged logs because of the large amount of wastage. The shattering and splitting of the wood fibers is particularly noticeable in freezing weather which renders the wood brittle and therefore more likely to be damaged by the shears. Furthermore, there is a limit to the size of trees which can be cut using power shears and they are usually employed in cutting the smaller trees used in the pulp industry.

Motor driven chain saws have been mounted on vehicles in an effort to speed up the falling of trees and to avoid the damage thereto caused by power shears but chain saws themselves have not proven to be entirely satisfactory. For example, a saw chain is relatively fragile and can be broken if the chain saw is not used with extreme care. The chain requires frequent sharpening as well as other maintenance and tends to bind in the kerf or to clog the saw with chips or with ice and snow during winter cutting.

We overcome some of the disadvantages of both power shears and chain saws by providing a tree cutting apparatus which is fitted with a unique cutting element somewhat like an elongated milling cutter. This type of cutter can be advanced through a tree to cut chips from across the grain and without crushing or splitting the fibers. The shaft-like cutter has a diameter which provides the necessary strength and durability and which forms a kerf wide enough to admit a fairly heavily constructed cutter-supporting blade. A tree when cut sits on the blade and is also supported by a superimposed pusher assembly whereupon the apparatus and the tractor to which the apparatus is attached are moved to cast the tree to one side away from the intended path of the vehicle. Such a cutter can be used on trees of a diameter which cannot be cut by conventional tree shears and the speed of falling is approximately the same as a chain saw.

In drawings which illustrate a preferred embodiment of the invention,

FIG. 4 is an enlarged horizontal section, part in elevation, taken on the line 4—4 of FIG. 1, FIG. 5 is a further enlarged transverse section of a movable blade for the apparatus and taken on the line 5—5 of FIG. 4, and FIG. 6 is a fragmentary horizontal section, part in elevation, showing details of a cutter and mounting therefor carried by the movable blade.

Figure 1:
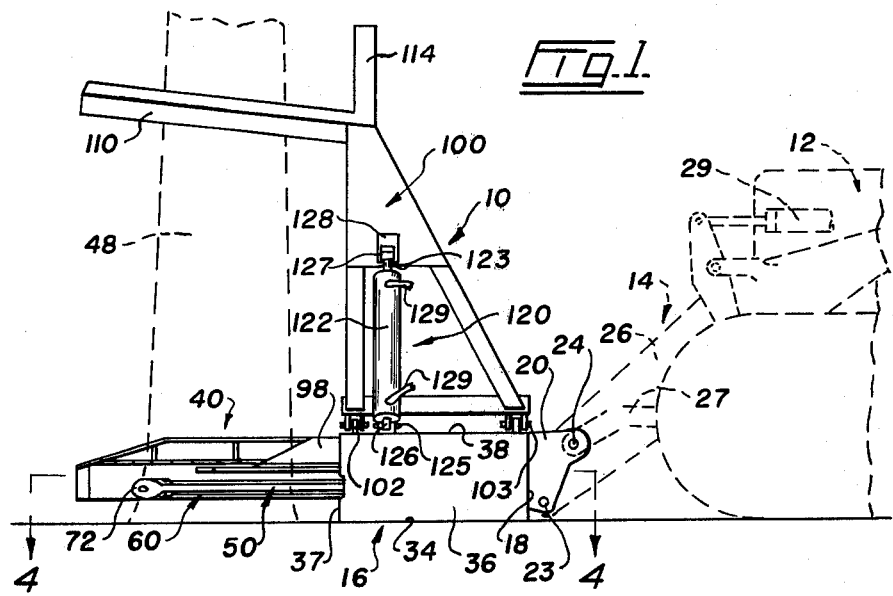
FIG. 1 is a side elevation of a tree cutting apparatus.

Referring to the drawings, the numeral 10 indicates generally a tree cutting apparatus in accordance with the present invention, the apparatus being shown conveniently mounted on the front end of a crawler tractor 12. The apparatus 10 is intended to be raised and lowered as well as tilted forwardly and rearwardly and most tractors, whether of the crawler-type or the rubber-tired type, are equipped with some sort of mechanism such as the one indicated generally by the numeral 14 which can be used for this purpose.

Apparatus 10 is provided with a base frame 16 having a rear wall 18 which is fitted with laterally spaced apart brackets 20. These two brackets 20 each carry two pivot pins 23 and 24. A pair of arms 26 forming part of the mechanism 14, and which extend forwardly from the tractor 12, have their front ends secured to the brackets 20 by the horizontally aligned pins 23. Another forwardly extending pair of arms 27 of the mechanism 14 are connected to the same brackets 20 by the horizontally aligned pins 24. The mechanism 14 is adapted to be operated by the usual rams 29, one only shown in FIG. 1, so that the present apparatus can be raised and lowered as well as tilted. When the mechanism 14 is operated to lift the front ends of the arms 26, the arms 27 cause the apparatus to tilt forwardly about the horizontal axes of the pins 23. Lowering of the arms 26 tilts the apparatus 10 rearwardly so that the base frame 16 is about horizontal when in contact with the ground. Thus, the apparatus 10 can cut off a tree very close to ground level and, when the tractor 12 is travelling through the woods or elsewhere, the apparatus can be lifted clear of obstacles. The driver controlled mechanism 14 is quite well known and is of conventional construction and since it is not a novel part of the present invention, further detailed description is not considered necessary.

The base frame 16 preferably is of welded box construction so that, in addition to the rear wall 18, it has a bottom wall 34, side walls 35 and 36, a front wall 37, and a top wall 38. Wall 37 is provided with a hollow blade 40 which projects forwardly near the side wall 35. The blade 40 has a top wall 42 and a side wall 43 which is disposed substantially at right angles to the front wall 37 of the base frame. Secured to the wall 43 is a guard plate 45 which extends inwardly parallel to and just below the top wall 42. Along the free edge of the guard plate 45, there are tree-gripping teeth 46.

Blade 40 is intended to be placed in contact with one side of a tree 48 to be cut so as to serve as a buttress or anvil for the tree. For this purpose, the anvil blade 40 preferably is made stationary, or so that it cannot move relative to the base frame 16. Under some circumstances, it might be desirable to have the blade 40 mounted on the frame 16 so that it can be moved or swung into contact with the tree but such an arrangement complicates both the construction and operation of the tree cutting apparatus.

Figure 2:
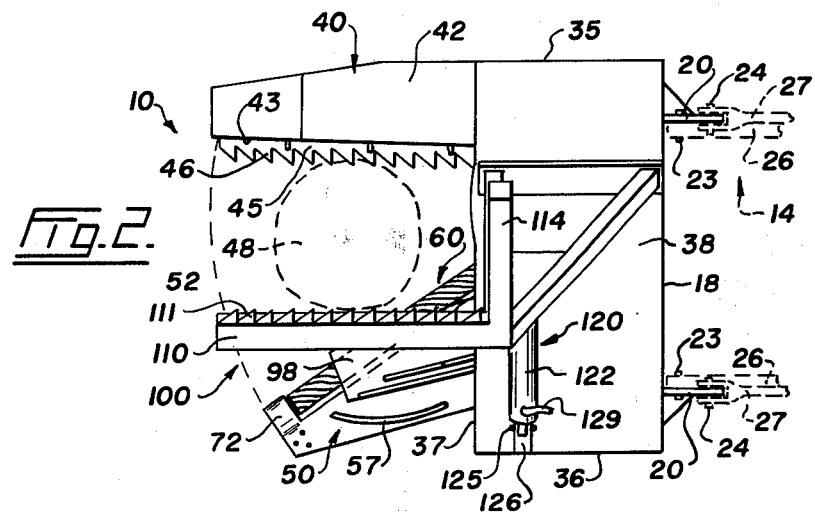
FIG. 2 is a plan of the apparatus.

Mounted on the frame 16, is another blade 50 which normally is spaced from the anvil blade 40 to provide a gap 52 therebetween, see FIGS. 2 and 4. As shown best in FIGS. 4 and 5, the blade 50 is an elongated plate which is mounted to swing about a spindle 54, the spindle extending vertically through and being suitably journalled in the frame 16. The plate-like blade 50 projects outwardly through a slot 56 (FIGS. 3 and 4) formed in the front wall 37, and in a plane which will allow said blade to oppose the anvil blade 40. On the top surface of the blade 50, there are a plurality of upstanding ribs 57, these ribs having a sharpened upper edge 58 and being curved and eccentrically disposed with respect to the spindle 54.

The movable blade 50 carries a cutter 60 which is formed of a cylindrical shaft of good quality steel suitably hardened. As shown best in FIGS. 4 and 5, the cutter 60 is provided with a suitable number of helical flutes 62 and cutting edges 63 with the edges each having a radial clearance as indicated by dotted lines at 64 in FIG. 5. The clearance 64 may vary according to the type of wood which is to be cut and so will the pitch of the edges 63, the size of the flutes 62 and other factors relating to the cutter 60.

In order to journal the cutter 60, the blade 50 is provided with bearings 68 and 69. The bearing 68 is mounted on the free end of the movable blade 50 so as to overhang leading edge 71 of said blades. A reduced end 72 (FIG. 6) of the cutter is received in this outboard bearing which is of the self-aligning type as shown in this Figure. Bearing 69 is secured to the blade 50 within the frame 16 and a threaded end 73 of the cutter projects through this bearing which is self-aligning as well. A threaded sleeve 74 supports the shaft end 73 within the bearing 69 as shown in FIG. 6. Thus, the shaft-like cutter 60 is journalled spaced from and extending parallel to the blade edge 71 and so as to be able to flex slightly udner load.

Drive means generally indicated at 76 is provided for rotating the cutter 60 about its longitudinal axis. As shown in FIG. 4 and in detail FIG. 6, the drive means 76 comprises a hydraulic motor 78 having a splined output shaft 79, the motor being mounted on a bracket 80 secured to the blade 50. A universal coupling 82, which also compensates for flexing of the cutter 60, is combined with a flywheel 84 having a splined hub 85. The shaft 79 of the motor is received in the hub 85 to complete the drive train between the motor 78 and the cutter 60.

The hydraulic motor 78 is included in a suitable circuit 86, not shown in its entirety, but which includes hose lines 87 as shown in FIGS. 4 and 5. This hydraulic circuit 86 extends to the tractor 12 which develops the fluid pressure needed to power the operating parts of the apparatus 10. Also included in the hydraulic circuit 86, are control valves (not shown) which are adapted to be operated by the tractor driver, as well as all the usual elements such as relief valves and the like (also not shown) which are commonly provided to ensure the safe and precise control of hydraulically operated machines of this kind.

Apparatus 10 is also provided with power means generally indicated at 90 in FIG. 4 intended for use to swing the blade 50 about the spindle 54 and thereby move the cutter 60 towards and away from the anvil blade 40. In FIG. 4, the power means 90 is shown to comprise a hydraulic cylinder 92 having a piston rod 93. A pin 94 secures an end of cylinder 92 to the frame 16 and the rod 93 has its opposite end secured to the blade 50 by a pin 95. The double-acting cylinder 92 is fitted with hose lines 96 which are included in the previously mentioned hydraulic circuit 86 whereby said cylinder can be pressurized by the tractor driver using a suitable control valve, not shown. Thus, by pressurizing appropriate ends of the cylinder 92, the blade 50 can be swung about the spindle 54 so that the cutter 60 is caused to execute a cutting stroke and a return stroke.

Figure 3:
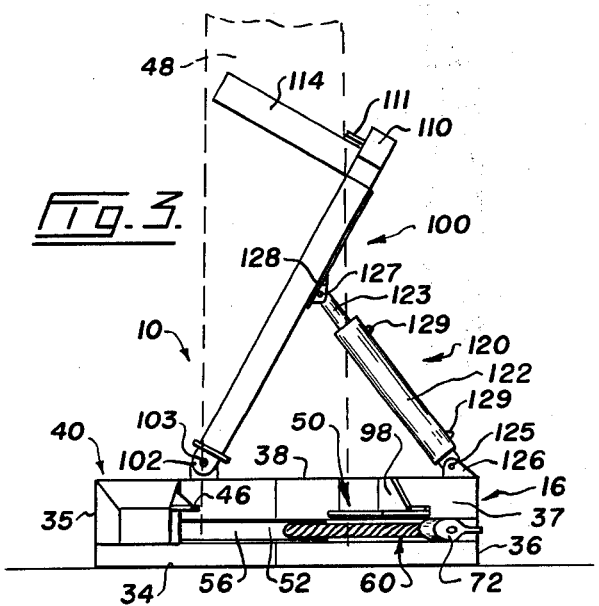
FIG. 3 is a front elevation of the apparatus.

Mounted on the front wall 37 of the base frame is a forwardly projecting guard plate 98, see FIGS. 1, 2 and 3. This substantially triangular shaped plate 98 is positioned so as to extend over a major portion of the length of the cutter 60 when the blade 50 is in the open position, see particularly FIG. 2, thus providing some measure of protection for this vital part of the tree cutting apparatus 10.

The tree 48 to be cut by the apparatus 10 is adapted to be engaged and supported by a pusher frame indicated generally at 100 as shown in FIGS. 1, 2 and 3. This substantially triangular frame 100 is swingingly mounted on the top wall 38 of the base frame. The lower corners of the frame 100 are hingedly secured to the top wall 38 by hinge means 102 each of which includes a pin 103. The aligned hinge pins 103 are located near the blade 40 and are parallel to the wall 43 of that blade. Thus, the pusher frame 100 is mounted to swing about an axis extending substantially parallel to the longitudinal axis of the blade 40, or the corresponding axis of the tractor 12.

An arm 100 is provided on the upper end of the frame 100 to engage a side of the tree 48 as it is cut by the apparatus 10 and, to do this, the arm extends forwardly and preferably is inclined slightly upwards. The arm 110 is fitted with a serrated jaw 111 (FIG. 2) intended to dig into the bark of a tree. Another arm 114, which may be shorter than the first arm, is also provided on the frame 100. This second arm 114 is disposed substantially at right angles to the first-mentioned arm to extend towards the anvil blade 40.

The pusher frame 100 is adapted to be swung back and forth on its hinge mounting by power means generally indicated at 120. In FIGS. 1 and 3, the power means 120 is shown to comprise a double acting hydraulic cylinder 122 and piston rod 123 therefor. A pivot pin 125 secures the cylinder 122 to a bracket 126 mounted on the frame 16 and another such pin 127 connects the rod 123 to a bracket 128 carried by the frame 100. Hose lines 129 connect the cylinder 122 into the hydraulic circuit 86 provided for this apparatus and this circuit also has a driver controlled valve (not shown) for selectively pressurizing opposite ends of said cylinder.

To operate the tree cutting apparatus 10, the tractor 12 is manoeuvred and the apparatus 10 is raised, lowered or tilted as required to enter a tree between the blades 40 and 50. With the cutter 60 rotating at a suitable speed, the cylinder 92 is pressurized to advance the blade 50 and move the cutter 60 progressively through the tree 48 which at this time is supported by the pusher frame 100. The cylinder 122 is pressurized to swing the arm thereon slowly so as to push the tree to one side as the cut progresses and thereby stop the carrier 60 from binding in the kerf. Finally, the pusher frame 100 is swung hard over to ensure that the tree falls away from the apparatus when the cut has been completed.

It will be noted that the tree 48 is cradled by the arms 110 and 114 during the entire cutting operation whereby the tree is properly supported and is unlikely to fall in an unintended direction. The teeth 46 on the guard plate 45 and the serrations on the arm 110 dig into the bark of the tree and help to hold the cut tree against toppling in the wrong direction. When the cut has been completed, the cutter 60 moves under the guard plate 45 and is shielded from damage thereby. The cut tree sits down on the blade 50 which purposely is held momentarily in the closed position to provide support for the butt end of the tree. The ribs 57 on the movable blade 50 engage and dig into the butt end of the tree in a manner which reduces the tendency of the tree to slip when it is supported by said blade and the pusher frame 100. With the cut tree held in this manner, the tractor 12 is moved forwards or backwards if necessary and is turned about its vertical axis while the apparatus 10 is raised slightly and the pusher frame 100 is swung hard over. The combination of these movements will serve to cast the cut tree away from the intended path of travel of the vehicle 12 which then can move up to the next tree without hindrance to speed up the cutting operation.

The cutter 60 is moved sideways through the tree substantially at right angles to the longitudinal axis of the tree and since the cutter is formed of a quite flexible steel shaft, it can readily bow in any direction to compensate for uneven stresses to which it may be subjected. The self-aligning bearings 68 and 69 as well as the universal joint 82 allow this flexing to take place without interrupting the drive from the motor 78. As the blade 50 is advanced through the kerf, the arcuate ribs 57 engage the butt end of the tree and lends some support to the rapidly rotating cutter 60. The cutting action of the milling-type cutter 60 is such that a kerf is formed by the removal of quite fine wood chips. Some of the wood chips are thrown outwardly away from the direction of the cut while a portion of the chips travel along the flutes 62 and are discharged near one end of the cutter. When there is any amount of sap in a tree being cut, the flutes 62 might tend to become clogged with the wood chips which become stuck to one another and to the metal cutter by the sap. Much the same thing will happen when the tree cutting is being done in deep-packed snow as is often the case.

In order to prevent an undue amount of clogging of the cutter flutes, we provide the tree cutting apparatus 10 with means generally indicated at 130 for directing pressurized fluid against the cutter 60 as it cuts through the tree. As shown best in FIGS. 4 and 5, the means 130 comprises a smallbore pipe 132 which is mounted in a rebate 133 on the blade 50 to extend along the edge 71 thereof. Pipe 132 is provided with a plurality of nozzles 134 which are directed towards the cutter 60. A flexible hose 135 connects the pipe 132 to a source of air pressure (not shown) aboard the tractor 12. The tractor is provided with a suitable control (also not shown) which the driver can operate periodically to blow jets of air against the cutter 60 and clear away any build-up of chips.

The means 130 also includes a nozzle 137 which is suitably mounted on the blade 50 near the bearing 69, see FIG. 4 only. Mounted either on top of the base frame 16, or within said frame as shown in FIG. 4 only, is a tank 140 which contains kerosene or some other suitable cleaning fluid. A small electric motor 141 is adapted to draw fluid from the tank 140 and deliver it through a hose line 142 to the nozzle 137. Lead lines 144 (FIG. 4) connect the pump 141 to a switch (not shown) within reach of the tractor driver. Thus, whenever the driver deems it necessary, and preferably when the blade 50 is open as shown in FIG. 4 for example, jets of the kerosene can be directed at the cutter 60 to help free any compacted chips which may be glued together by sap.

From the foregoing, it will be apparent we have provided tree cutting apparatus which allow the harvesting to be done with ease and speed even in rugged terrain. The milling-type cutter will withstand a considerable amount of abuse and will stay sharp longer than a saw chain for example. Since a clean cut is milled or chipped out across the grain, there is little or no damage by splitting to the wood fibres with the result that wastage is kept to a minimum. A tractor operator, working alone if need be, can cut and fall trees in relative safety since the pusher assembly of the present apparatus provided a good degree of control over an operation which otherwise can be hazardous.

We claim:

1. Tree cutting apparatus attachable to a vehicle to be operated therefrom and comprising a base frame, an anvil blade carried by the base frame and extending outwardly therefrom in a generally horizontal direction, a movable blade mounted on the base frame in opposition to and for swinging movement towards and away from the anvil blade, a cutter rotatably mounted on the movable blade and extending longitudinally opposite the anvil blade, said cutter being a substantially cylindrical shaft having helical flutes and cutting edges on the outer surface thereof, drive means for rotating the cutter about its longitudinal axis, power means operable to swing the movable blade towards the anvil blade whereby the rotating cutter progressively is advanced to cut through a tree entered between the blades, a pusher frame hingedly mounted on the base frame for swinging movement about an axis extending substantially parallel to the longitudinal axis of the anvil blade, a tree-engaging arm extending outwardly from an upper end of the pusher frame, and power means interconnecting the pusher frame and the base frame, said power means being operable to swing the pusher frame whereby to tilt the tree and open the kerf formed by the cutter, said movable blade entering the kerf behind the cutter to engage the butt end of the cut tree and carry a major part of the weight of said cut tree, said tree-engaging arm cooperating with the movable blade to support the substantially upright and overbalanced cut tree.

2. Apparatus as claimed in claim 1, in which said movable blade has a plurality of upstanding ribs adapted to dig into the butt end of the cut tree when carried by the movable blade.

3. Apparatus as claimed in claim 1, and including a toothed guard plate mounted on the anvil blade to engage a side of the tree and project over the cutter when the movable jaw is in the closed position.

4. Apparatus as claimed in claim 1, in which said tree-engaging arm has a serrated jaw projecting outwardly therefrom in a direction opposite to the toothed guard plate.

5. Apparatus as claimed in claim 1, in which said cutter is rotatably mounted in self-aligning bearings carried by the movable blade, said drive means including a motor having an output shaft, and a universal joint operatively connecting an end of said cutter to the output shaft.

* * * * *